United States Patent [19]

Freund et al.

[11] Patent Number: 5,768,587
[45] Date of Patent: Jun. 16, 1998

[54] OPERATING A TRANSACTION MANAGER WITH A NON-COMPLIANT RESOURCE MANAGER

[75] Inventors: Thomas Freund, Winchester; Robert Anthony Storey, Southampton, both of United Kingdom

[73] Assignee: International Business Machine Corp., Armonk, N.Y.

[21] Appl. No.: 901,459

[22] Filed: Jul. 28, 1997

[30] Foreign Application Priority Data

Aug. 31, 1996 [GB] United Kingdom .................. 9618248

[51] Int. Cl.⁶ ............................................. G06F 15/00
[52] U.S. Cl. ...................... 395/671; 395/680; 395/182.17
[58] Field of Search .................................. 395/671, 680, 395/182.17

[56] References Cited

U.S. PATENT DOCUMENTS 5,428,771  6/1995  Daniels et al. ......................... 395/575
5,473,680  12/1995  Porter ................................. 379/201
5,504,899  4/1996  Raz .................................... 395/650
5,706,500  1/1998  Dzikewich et al. ................... 395/610
5,729,733  3/1998  Sharif-Askary ....................... 395/608

FOREIGN PATENT DOCUMENTS

0103295  3/1984  European Pat. Off. .
0465035  1/1992  European Pat. Off. .

*Primary Examiner*—Lucien U. Toplu
*Attorney, Agent, or Firm*—Jerry W. Herndon

[57] ABSTRACT

The invention allows the participation of a resource manager in a transaction which is coordinated by a transaction manager with which the resource manager's protocols are not compatible. More particularly, a mapper records a connection reference which the application program obtains from the resource manager and a transaction reference which the application program obtains from the transaction manager. The resource manager stores recovery information in an associated log file.

7 Claims, 6 Drawing Sheets

OPERATING A TRANSACTION MANAGER WITH A NON-COMPLIANT RESOURCE MANAGER

FIELD OF THE INVENTION

The present invention relates to the field of data processing, more specifically to transaction processing systems, and in particular to operating a resource manager with a transaction manager with which the resource manager protocols are not compliant.

BACKGROUND ART

Co-pending U.S. patent application "Heterogeneous Operations with differing Transaction Protocols", assigned to the assignee of the present invention, filed Oct. 23, 1996, Ser. No. 08/735,626, is hereby incorporated by reference.

Transactions

Computer implemented transaction processing systems are used for critical business tasks in a number of industries. A transaction defines a single unit of work that must either be fully completed or fully purged without action. For example, in the case of a bank automated teller machine (ATM) from which a customer seeks to withdraw money, the actions of issuing the money, reducing the balance of money on hand in the machine and reducing the customer's bank balance must either all occur or none of them must occur. Failure of one of the subordinate actions would lead to inconsistency between the records and actual occurrences.

Distributed Transactions

Distributed transaction processing involves a transaction that affects resources at more than one physical or logical location. In the above example, an ATM transaction affects resources managed at the local ATM device as well as bank balances managed by a bank's main computer. A distributed transaction may be physically distributed or it may not be physically distributed but may involve cooperating tasks that must be completed in synchronism for successful transaction completion.

X/Open

The X/Open Company Limited (X/Open is a trademark of X/Open Company Ltd.) has promulgated a guide that describes one model for implementing distributed transaction processing. The X/Open Guide, Distributed Transaction Processing Reference Model, February 1996, ISBN 1-85912-170-5, discusses the components of a distributed transaction system and the interrelationships between them. The X/Open Distributed Transaction Processing Model (the DTP Model) describes three main components: an Application Program (AP), a Transaction Manager (TM), and one or more Resource Managers (RMs). The Application Program uses and modifies the resources controlled by one or more of the Resource Managers. The Transaction Manager is responsible for global transactions and coordinates the decision whether to commit or roll-back the actions taken by the Resource Managers. (Commit causes the resources to be updated while roll-back causes all work to be discarded returning the resources to the state they were in upon transaction initiation.) The Resource Managers manage specific resources. Resource Managers may include a database management system (DBMS), a file system, or similar resource. An X/Open Transaction Manager communicates with a Resource Manager by means of a programming interface called the XA Interface.

Two phase commit

The X/Open DTP model describes and many commercial transaction processing systems use what is termed a "two phase commit" process to decide whether or not to commit the changes made by a transaction. The first phase involves the transaction manager determining whether each of the resource managers believes it is able to successfully commit the changes made by the transaction. If any resource manager indicates that it cannot commit, or fails to respond, the transaction manager causes the changes to be rolled back in each resource manager. If all of the responses are positive, then the transaction manager orders all of the resource managers to commit the transaction.

U.S. Pat. No. 5,428,771 discloses a prior art transaction processing system including a conversion bridge for connecting a second Transaction Manager executing in a different environment to that of the distributed transaction processing environment. The conversion bridge is required to perform mappings between the two different environments, which includes the correlation of differing transaction identification specifications. It is also required to record appropriate state information, which requires a persistent archival of transaction and other gateway state information as well as to provide procedures to effect failure and restart scenarios, including the interpretation of differing commit protocols and the bridging of transaction commitment domains. The transaction processing system also has an application program executing in a second distributed transaction processing environment. The transaction processing bridge has the additional function of converting the respective transaction processing protocols of each system into protocols which can be utilised by the other system. For example, the distributed transaction processing environment may be using the Two Phase Commit/Presumed Abort protocol of the AIX operating system and the second distributed transaction processing environment may be using the Two Phase Commit/Presume Nothing protocol of SNA (AIX is a trademark of IBM Corporation). These protocols differ in that the Two Phase Commit/Presumed Abort presumes that in the absence of any information regarding a transaction's outcome the transaction is aborted. The SNA protocol presumes nothing regarding transaction outcome and maintains a list of transaction participants wherein Transaction Managers are required to exchange information among or between sites to determine the transaction outcome.

Object oriented programming

Object oriented programming systems are designed to increase the efficiency of program development by enabling object reuse and simplifying system maintenance through clear separation of function. Each object in an object oriented system encapsulates the data for that object and the procedures or methods for operating on that data. Encapsulation means that the data for an object can be manipulated only by that object using the defined methods. Object oriented systems specify the manner in which objects and their external interfaces are to be defined. One such object oriented system is System Object Model (SOM) from IBM Corporation. SOM is described in "SOMobjects: A Practical Introduction to SOM and DSOM", published by IBM Corporation, Copyright 1994, Order no. GG24-4357-00 (SOM and SOMobjects are trademarks of IBM Corporation).

OMG

The application of object oriented techniques to transaction processing systems raises many new issues but offers opportunities to increase system efficiency through the use of object oriented principles. The Object Management Group, Inc. (OMG) has established standards for interoperable object oriented systems. The overall architecture defined by OMG is the Object Management Architecture (OMA). A central component of OMA is the Object Request Broker that enables objects to send messages to other objects. The Common Object Request Broker Architecture (CORBA) defines the interactions between objects, and in particular, between distributed objects in different computer systems. The Object Request Broker (ORB) provides location transparency and hides the details of communication between objects. CORBA is specified in the OMG publication entitled, The Common Object Request Broker: Architecture and Specification, March 1992.

OTS

OMG has accepted a specification to standardise transaction processing in object oriented systems. This specification, entitled the Object Transaction Service (OTS) Specification, OMG document 94.8.4, sets forth the requirements for object services necessary to implement a transaction processing system. The OTS comprises a set of standard interfaces which object oriented applications may use to achieve recoverable behaviour. It also comprises a set of standard interfaces with an ORB to allow propagation of transaction context between ORB processes and to allow recovery of OTS state at server startup. The OTS specification uses many of the unique capabilities of object oriented systems. The OTS model, however, is designed to be interoperable with the X/Open DTP model and with existing procedural transaction processing systems.

DTC

The Distributed Transaction Coordinator (DTC) software product from Microsoft Corporation is a transaction coordinator that provides transactional coordination facilities using the ACID (Atomicity, Consistency, Isolation and Durability) characteristics of transactions. Transactions within DTC are represented by transactional objects. These transactional objects are created and managed by DTC and are operated on by application programs and resource managers using DTC services.

The only resource managers which DTC supports are resource managers which conform to the Microsoft Object Linking and Embedding (OLE) transaction interface definition. This means that existing standards-compliant resources are required to re-code their transaction manager to resource manager interface to the Microsoft OLE transaction interface definition. Examples of such existing standards-compliant resources are the DB2 database from IBM Corporation, Oracle databases, Sybase databases, Informix databases and files such as Gresham Products ISAM files (DB2 and IBM are trademarks of IBM Corporation). Support is included in DTC to allow DTC services and resources to be used with existing transaction monitor environments by providing a mapper that converts from DTC services and resources to the X/Open XA interface. Support is however not included in DTC to allow the reverse, that is resource managers having other than an OLE interface, such as an X/Open XA interface, to be used with the Microsoft DTC transaction coordinator.

Resource managers such as the DB2, Oracle, Sybase and Informix databases and the Gresham products ISAM files are therefore not supported for use with DTC without modification to the resource managers. It would be desirable if such resources could be used without modification in a DTC transaction environment.

DISCLOSURE OF THE INVENTION

Accordingly the invention provides a method of processing in a data processing system, a first transaction initiated by an application program and requiring the involvement of a resource manager, the first transaction being managed by a first transaction manager, the protocols of said first transaction manager not being compliant with those of the resource manager, the system further including a second transaction manager, whose protocols are compliant with those of the resource manager and a mapper for converting calls to said first transaction manager to calls to said second transaction manager, the method comprising the steps of the application program establishing a connection reference to the resource manager; the application program obtaining a transaction reference from said first transaction manager; and the mapper initiating a second transaction managed by a second transaction manager with said resource manager, the protocols of said second transaction manager being compliant with those of the resource manager.

The method is characterised in that it further comprises the step of, after the application program initiates a transaction, said mapper records said connection reference and said transaction reference and associates said connection reference and said transaction reference with a transaction identifier recognisable by the resource manager.

This has the advantage that existing standards-compliant resources such as the DB2, Oracle, Sybase and Informix databases and the Gresham products ISAM files, which resources are not compliant with the DTC transaction manager, may be used with the DTC transaction manager without the requirement of re-coding application programs.

The invention also provides a transaction processing system for processing a first transaction initiated by an application program executing within a data processing system, the transaction system comprising a first transaction manager, for managing said first transaction, which provides the application program with a transaction reference; a resource manager, utilised by said first transaction, with which the protocols of said transaction manager are not compliant and which has a connection reference established by an application program; a second transaction manager, whose protocols are compliant with said resource manager; and a mapper, which initiates a second transaction managed by a second transaction manager with said resource manager, the protocols of said second transaction manager being compliant with those of the resource manager.

The system is characterised in that said mapper records said connection reference and said transaction reference and associates said connection reference and said transaction reference with a transaction identifier recognisable by the resource manager.

BRIEF DESCRIPTION OF THE DRAWINGS

An embodiment of the invention will now be described, by way of example only, with reference to the accompanying drawings, in which.

DETAILED DESCRIPTION OF THE INVENTION

Figure 1:
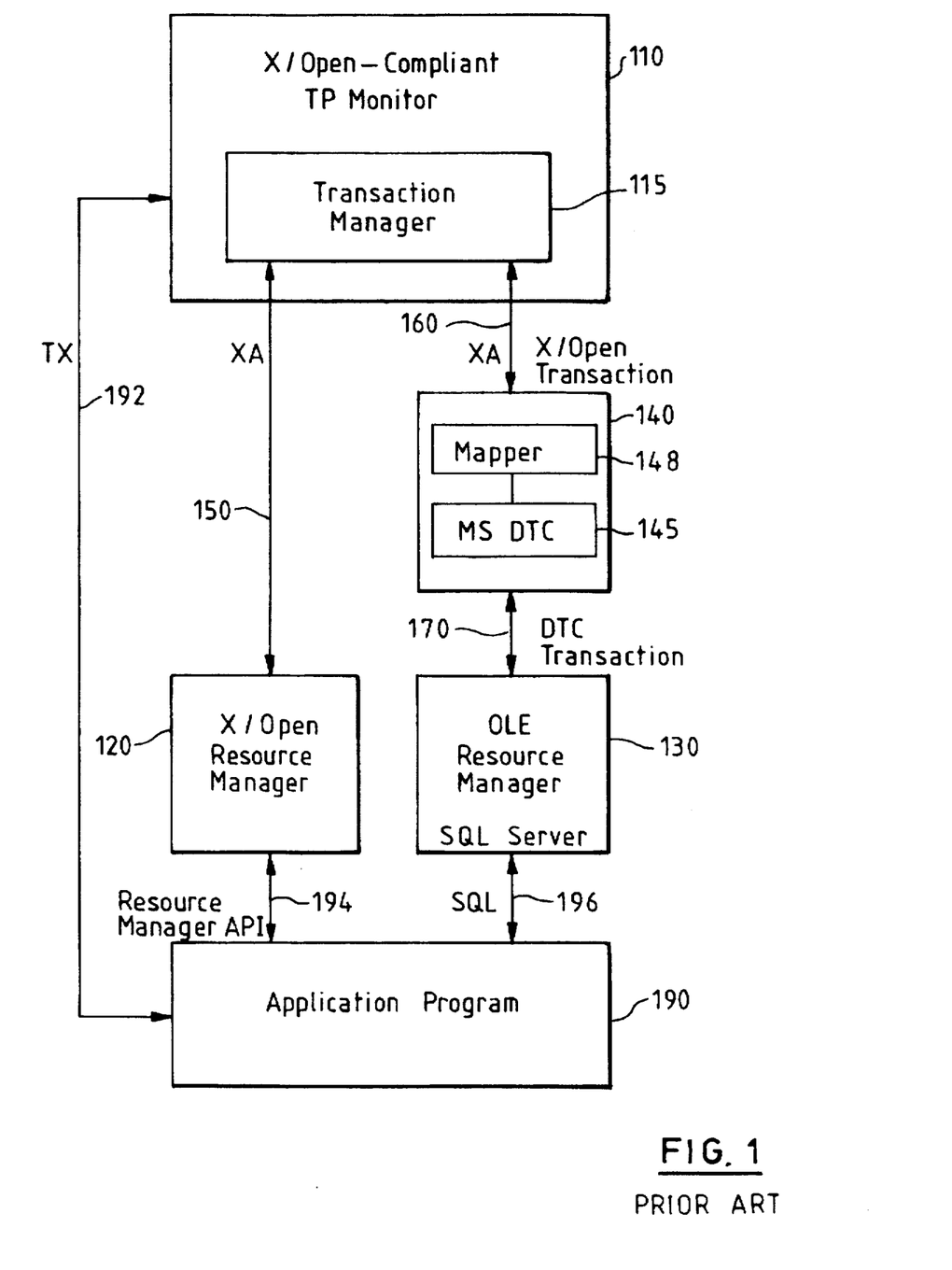
FIG. 1 is a block diagram of a prior art system in which DTC resources participate in an X/Open managed transaction.

FIG. 1 shows a block diagram of a prior art system in which a resource having an OLE interface participates in an X/Open managed transaction. The transaction system includes an X/Open-Compliant TP Monitor 110 which includes an X/Open Transaction Manager 115, an X/Open-Compliant Resource Manager 120, an Object Linking and Embedding (OLE) Resource Manager 130 and a DTC TP Monitor 140. The DTC TP Monitor 140 includes a Mapper 148 and an DTC Transaction Manager 145. Also shown in FIG. 1 is an Application Program 190. The X/Open Transaction Manager 115 coordinates a transaction initiated by the Application Program 190 and involving an X/Open Resource Manager 120 and an OLE Resource Manager 130. The OLE Resource Manager 130 is managed by the X/Open Transaction Manager 115 through the DTC TP Monitor 140. The X/Open Transaction Manager 115 is able to manage the OLE Resource Manager 130, since the OLE Resource Manager 130 is designed to be compatible with the X/Open Transaction Manager 115.

Figure 2:
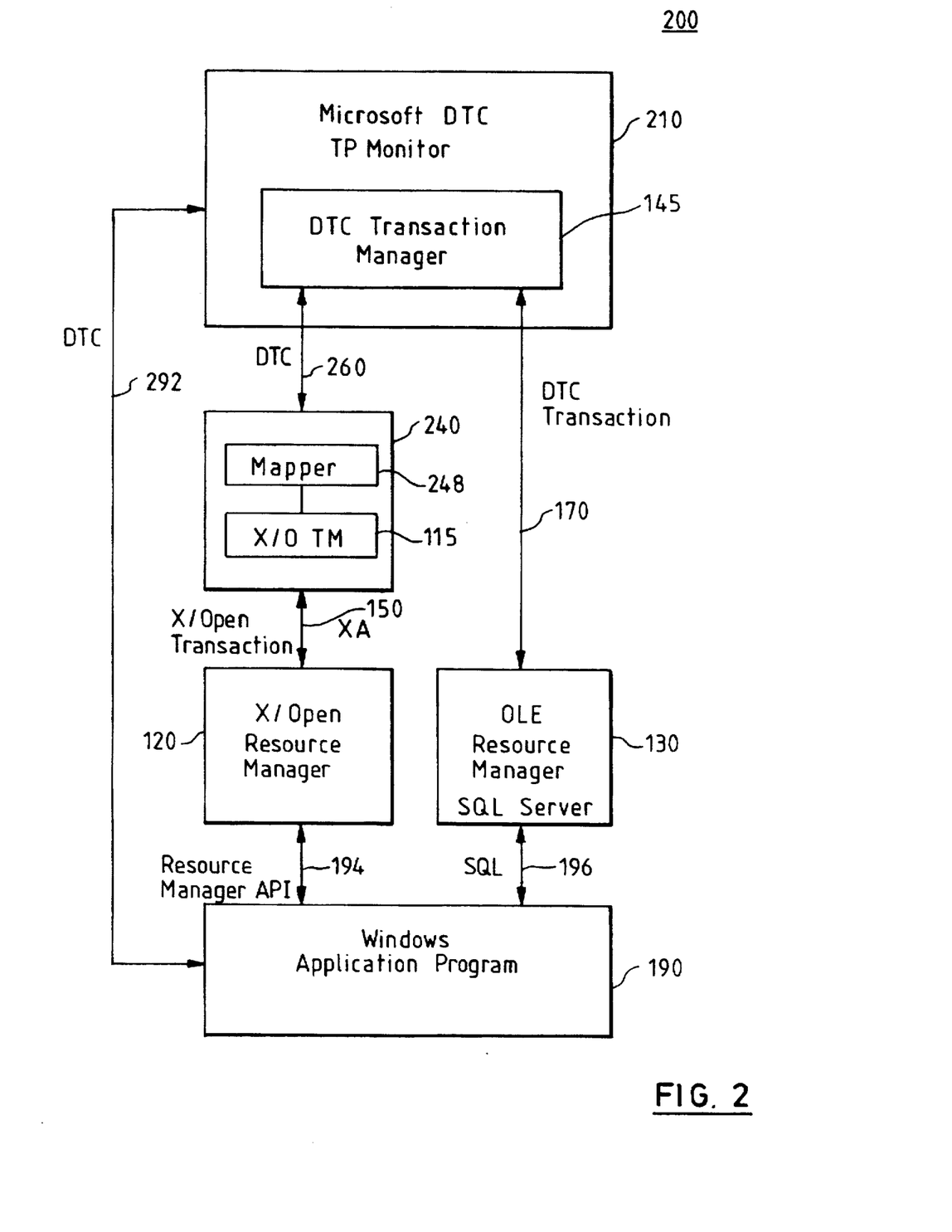
FIG. 2 is a block diagram of a system in which X/Open resources participate in a DTC managed transaction and in which the present invention is utilised.

FIG. 2 represents a first embodiment using X/Open-Compliant components for the Resource Manager 120 and the TP Monitor 240, including within the TP Monitor 240 a Transaction Manager 115 and a Mapper 248, which in this embodiment maps from DTC protocols to X/Open protocols and vice-versa. As mentioned earlier, the OTS model is designed to be interoperable with the X/Open DTP model and so in a second embodiment the Resource Manager is an OTS-compliant resource manager and the Transaction Manager is an OTS-compliant TP manager. The mapper in this embodiment maps from DTC protocols to OTS protocols and vice-versa. Other standards-compliant transaction environments may be used in yet further embodiments. In the description which follows the embodiment implemented in the X/Open transaction processing environment is described, but where any reference is made to X/Open or to X/Open-compliant, this may also be taken as a reference to OMG OTS or to OMG OTS-compliant or to any standard-compliant transaction processing environment.

Resource managers such as the DB2, Oracle, Sybase and Informix databases and the Gresham products ISAM files are therefore not supported for use with DTC without modification to the resource managers.  HERE  FIG. 2 shows, by way of example, a block diagram of an embodiment of a transaction system 200 in which the present invention may be implemented. The transaction system includes a Microsoft DTC TP Monitor 210, which includes a DTC Transaction Manager 145, an X/Open-Compliant Resource Manager 120, an Object Linking and Embedding (OLE) Resource Manager 130 and a X/Open-Compliant TP Monitor 240. The X/Open-Compliant TP Monitor 240 includes a Mapper 248 and an X/Open-Compliant Transaction Manager 115. Also shown in FIG. 2 is an Application Program 190.

The only resource managers which the DTC Transaction Manager 145 is compatible with are those resource managers which conform to the Microsoft Object Linking and Embedding (OLE) transaction interface definition. This means that existing standards-compliant resources are required to re-code their transaction manager to resource manager interface to the Microsoft OLE transaction interface definition.

An overview of a transaction executing in the system of FIG. 2 will now be given. The Application Program 190 initiates a transaction which is managed by the DTC Transaction Manager 145. The transaction uses resources which are managed by the Resource Managers 120, 130. The Application Program 190 asks the DTC Transaction Manager 145 to complete the transaction. The DTC Transaction Manager 145 ensures that the resources involved in the transaction are in a consistent state and terminates the transaction, indicating to the Application Program 190 whether the transaction was committed or rolled back.

The mechanisms used by the various participants in the transaction to communicate with each other will now be described. The Application Program 190 uses a DTC interface 292 to communicate with the DTC Transaction Manager 145 in order to begin a transaction. The DTC interface 292 is an interface by which an Application Program 190 calls a DTC Transaction Manager 145 to demarcate global transactions and direct their completion. Further details of the DTC interface 292 can be found in "Microsoft Distributed Transaction Coordinator Resource Manager Implementation Guide, Version 6.5" (Microsoft is a trademark of Microsoft Corp.).

The X/Open Transaction Manager 115 and the X/Open Resource Manager 120 use an XA interface 150 to communicate with each other. The XA Interface is a programming interface by which an X/Open Transaction Manager 115 communicates with a Resource Manager 120. Further details of the XA interface can be found in X/Open Specification, Distributed TP: The XA Specification, February 1992, ISBN 1-872630-24-3.

The DTC Transaction Manager 145 and the OLE Resource Manager 130 use a DTC interface 170 to communicate with each other. The DTC Interface 170 is a programming interface by which a DTC Transaction Manager 145 communicates with an OLE Resource Manager 130. The DTC Transaction Manager 145 also communicates with the X/Open-Compliant TP Monitor 240 using a DTC Interface 260, the X/Open-Compliant TP Monitor 240 then using Mapper 248 to pass this communication to the X/Open Transaction Manager 115.

The Application Program 190 uses a Resource Manager API 194, 196 to initialise each of the Resource Managers 120, 130 it wishes to use. The Resource Managers 120, 130 then await input. The Resource Manager API 194, 196 (RM API) to the Application Program 190 is defined for each Resource Manager 120, 130 by the provider of that Resource Manager 120, 130, such as the industry standard ISAM API, or the Resource Manager API uses an industry standard Resource Manager API, such as the SQL API.

The execution of the transaction by the Application Program 190 will now be described. In its simplest form, the transaction consists of the following steps:

1. Begin Transaction—DTC
2. Perform Resource Manager operations
3. End Transaction—DTC.

1. Begin Transaction—DTC

The DTC Transaction Manager 145, in response to a request to begin a transaction from the Application Program 190 associates the transaction with an execution thread. By doing so the Transaction Manager 145 frees the Application Program 190 from having to track a specific transaction identifier itself. The Transaction Manager 145 also initiates a Transaction Object with appropriate structures, to track both transaction participant information and any outcome data. The Transaction Object is returned as a reference to the Application Program 190. The Application Program 190 sees the Transaction Object, but DTC itself maps the Transaction Object to a Transaction id (GUID or Global Unique IDentifier).

2. Perform Resource Manager operations

During execution of the transaction, the Application Program 190 will need to perform operations on resources owned by Resource Managers 120, 130. It communicates these requests using the RM API mentioned above. When communicating with the X/Open Resource Manager 120, the Application Program 190 must include within the communication the X/Open Transaction ID (Xid). When communicating with the OLE Resource Manager 130, the OLE interface must include a token or reference to the Transaction Object as part of the communication, but does not include the transaction id (GUID). The transaction id (GUID) is known only to DTC in this embodiment. Advantageously, other implementations of non-standards compliant transaction coordinators may include the transaction id (GUID) as part of the information passed to the OLE Resource Manager 130. This may be as user-defined transaction context. The Transaction Object, and hence the transaction id (GUID) with which the request is associated can be determined because only a single DTC transaction can be executed on a single connection. The X/Open transaction id (Xid) can then be determined by mapping.

When a request for services is received by the OLE Resource Manager 130, the OLE Resource Manager 130 registers with the DTC Transaction Manager 145 using an Enlist call from the DTC interface 170, such as IResourceManager::Enlist(&TransactionObject, ITransactionResourceAsync). This call includes a token that represents the active transaction or the Transaction Object. This ensures that when the outcome of the transaction maintained in the DTC Transaction Manager 145 having that transaction id (GUID) is to be decided, the OLE Resource Manager 130 is involved in the two phase commit process.

When a request for services is received by the X/Open Resource Manager 120, the X/Open Resource Manager 120 generates a transaction with the Transaction Manager 115 and registers with the Transaction Manager 115 using an ax_reg() call from the XA interface 150. This call returns the transaction id that was generated when the transaction was created. This ensures that when the outcome of the transaction having that transaction id is to be decided, the X/Open Resource Manager 120 is involved in the two phase commit process. The X/Open-Compliant Transaction Manager 115 then passes the ax_reg() registration call to the Mapper 248 which converts the call to a IResourceManager::Enlist call from the DTC interface. The Mapper 248 then passes the call to the DTC Transaction Manager 145 by means of the DTC interface 260. The Mapper 248 maintains the correlation between the DTC Transaction Manager 145 and the X/Open-Compliant transaction. The association is represented by the DTC transaction token or connection handle and the X/Open-Compliant transaction is represented by the X/Open transaction id.

3. End Transaction—DTC

The Application Program 190 uses the DTC interface 292 to communicate with the DTC Transaction Manager 145 in order to end the transaction. This communication includes the DTC Transaction Manager's 145 reference to the transaction associated with the application.

The DTC Transaction Manager 145, in response to the request from the Application Program 190 to end the transaction, issues an ITransactionResourceAsync::PrepareRequest call from the DTC interface to the OLE Resource Manager 130. This call is performed on the transaction associated with the connection. The OLE Resource Manager 130 prepares its resources and returns a prepared indication to the DTC Transaction Manager 145.

The DTC Transaction Manager 145, in response to the request from the Application Program 190 to end the transaction, also issues an ITransactionResourceAsync::PrepareRequest call from the DTC interface to the X/Open-Compliant TP Monitor 240. This call is performed on the transaction associated with the connection handle. The Mapper 248 within the X/Open-Compliant TP Monitor 240 uses the correlation information to map the PrepareRequest call to an xa_prepare() call from the XA interface and passes this on to the X/Open-Compliant Transaction Manager 115. The X/Open-Compliant Transaction Manager 115 then requests the X/Open Resource Manager 120 to prepare its resources. The X/Open Resource Manager prepares its resources and returns a prepared indication to the X/Open-Compliant Transaction Manager 115. The X/Open-Compliant Transaction Manager 115 records the transaction status and passes the prepared indication to the Mapper 248 which performs additional logging functions required by the DTC Transaction Manager 145. The Mapper 148 also maps the indication to an ITransactionEnlistmentAsync::PrepareRequestDone response from the DTC interface and passes the indication to the DTC Transaction Manager 145.

When the DTC Transaction Manager 145 has received "prepared" indications from all of the participants in the transaction, it issues an ITransactionResourceAsync::CommitRequest call to the OLE Resource Manager 130 to request it to commit its resources. The Resource Manager 130 commits its resources and returns a committed indication to the DTC Transaction Manager 145. Should any of the resources not be prepared to commit, then the relevant indications are returned to the DTC Transaction Manager 145 and in place of the commit call (CommitRequest), a rollback call (AbortRequest) is issued. The Application Program 190 may have decided to rollback directly or one of the participants in the two phase commit process may have responded that it is not prepared to commit the resources. In either of these cases the DTC Transaction Manager 145 issues a rollback call.

When the DTC Transaction Manager 145 has received "prepared" indications from all of the participants in the transaction, it also issues a ITransactionResourceAsync:: CommitRequest call to the X/Open-Compliant TP Monitor 240 to request it to commit its resources. This call is performed on the transaction associated with the connection. The Mapper 248 within the X/Open-Compliant TP Monitor 240 maps the CommitRequest call to an xa_commit() call from the XA interface and passes this on to the X/Open-Compliant Transaction Manager 115. The X/Open-Compliant Transaction Manager 115 requests the X/Open Resource Manager 120 to commit its resources. The X/Open Resource Manager 120 commits its resources and returns a committed indication to the X/Open-Compliant Transaction Manager 115. The X/Open-Compliant Transaction Manager 115 passes this indication to the Mapper 248 which maps the indication to ITransactionEnlistmentAsync: CommitRequestDone from the DTC interface and passes the indication to the DTC Transaction Manager 145.

Should any of the resources (the OLE or the X/Open) not be prepared to commit, then the relevant indications are returned to the DTC Transaction Manager 145 and in place of the commit call CommitRequest, a rollback call (AbortRequest) is issued. The Mapper 248 translates the rollback call (AbortRequest) to an xa_rollback from the XA interface. The Application Program 190 may have decided to rollback directly or one of the participants in the two phase commit process may have responded that it is not prepared to commit the resources. In either of these cases the DTC Transaction Manager 145 issues a rollback call.

Figure 3:
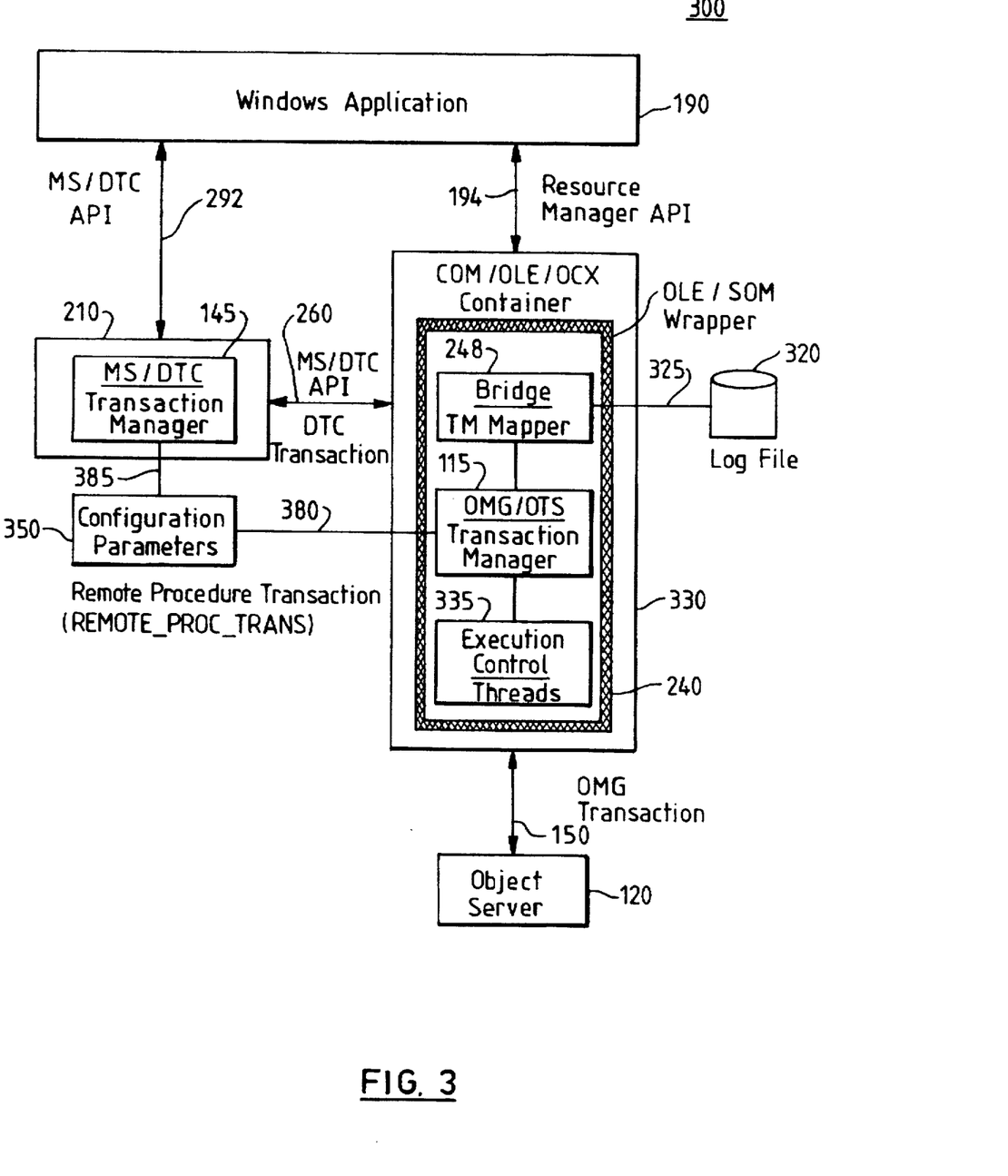
FIG. 3 is a block diagram of a specific embodiment of the components of the system of FIG. 2 participating in a DTC managed transaction and the interactions therebetween.

FIG. 3 is a block diagram of a specific embodiment of the components participating in a DTC managed transaction and the interactions therebetween in an object environment. Microsoft DTC TP Monitor 210, which includes a DTC Transaction Manager 145 is the same component as in FIG. 2, as are X/Open-Compliant TP Monitor 240 which includes a Mapper 248 and an OMG-compliant transaction manager which also contains an X/Open-Compliant Transaction Manager 115 and Application Program 190.

X/Open-Compliant TP Monitor 240 is implemented in this specific embodiment in the SOM object-oriented system. Other object-oriented systems such as NEO or DOOR from Sun and ObjectBroker from DEC may be used and references to SOM in this description may be replaced by references to other object-oriented systems. Around X/Open-Compliant TP Monitor 240 is an OLE/SOM wrapper, which makes the SOM objects within it appear from the outside to be an OLE object. The SOM objects are unaware that their contact with remote objects is through the wrapper. The OLE interface 260 sees the X/Open-Compliant TP Monitor 240 as an OCX container object. An OCX container object is merely an object which contains other objects within it. The Resource Manager 120 is an implementation of an Object Server. Interfaces 292 (DTC), 194 (Resource Manager API), 150 (X/Open XA) and 260 (DTC) are the same as their corresponding numbered interfaces in FIG. 2 except that the Resource Manager API 194 connects with the Resource Manager 120 through the OCX container 330, rather than directly. As mentioned above, in the description which follows an embodiment implemented in the X/Open transaction processing environment is described, but where any reference is made to X/Open or to X/Open-compliant, this may also be taken as a reference to OMG OTS or to OMG OTS-compliant or to any standard-compliant transaction processing environment. An X/Open Compliant Resource Manager may be used in this embodiment with an OMG Transaction Manager or an X/Open Transaction Manager. Similarly, an OMG Compliant Resource Manager may be used in this embodiment with an OMG Transaction Manager or an X/Open Transaction Manager.

A log file 320, in communication 325 with the Mapper 248, is used to record various pieces of data which the X/Open-Compliant TP Monitor 240 needs to ensure are available for recovery from a failure. This information includes transaction status information recorded when the resource manager is asked to prepare for completion of the transaction. In an X/Open transaction system, this is a responsibility of the Transaction Manager and the Resource Manager has no requirement for a log file. However, in DTC, the Resource Manager must provide such a log file. The log may also be used to store a mapping between the Connection handle returned by the Resource Manager to the Application Program, the DTC Transaction id and the X/Open transaction id (Xid). Execution Control Threads 335 within the X/Open-Compliant TP Monitor 240 and communicating with the X/Open-Compliant Resource Manager 120 are to allow dispatching of multiple concurrent requests to the Resource Manager 120 and to support operations where context is important across multiple methods. They also check for asynchronous behaviour and force completion of transactions when a commit request is received from the DTC Transaction Manager 145. Object 350 contains configuration parameters such as whether transactions are to be automatically initiated by a Resource Manager 120 when it receives a request from an Application program 190. These are used during runtime by the X/Open compliant TP Monitor 240 and the X/Open Transaction manager 115. Systems management facilities that specify configuration parameters are used to communicate 385 the configuration parameters to the DTC Transaction Manager 145 and a communication path 380 is used to communicate the configuration parameters to X/Open-Compliant Transaction Manager 115.

Figure 4:
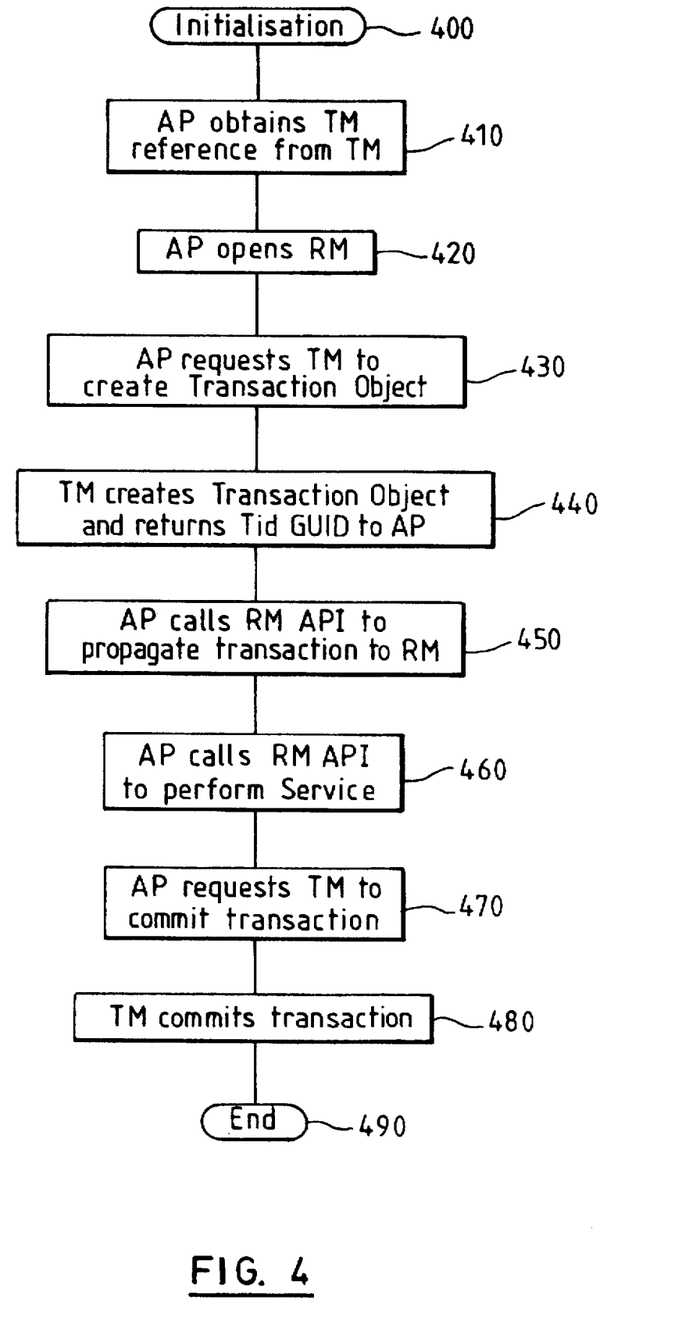
FIG. 4 is a flow diagram showing the steps involved in a DTC managed transaction in the system of FIG. 2.

FIG. 4 is a flow diagram showing the steps involved in a DTC managed transaction. The transaction is executing in the system shown in block diagram form in FIG. 2 or in FIG. 3.

At step 400, system management facilities are utilised to record the system services. The DTC Transaction Manager 145 and the OCX container representation of the X/Open Resource Manager 120 are entered into the DTC System Registry. Additionally, the standards-compliant services, such as X/Open or OMG Services are recorded in a directory along with the mapping to the OCX container. The directory may be an OMG Directory or an X/Open directory.

At step 410, the Application Program 190 obtains a DTC Transaction Manager Reference from the DTC Transaction Manager 145. This is obtained by a call to the DTC Interface of DTCGetTransactionManager(&TM Instance, TM Interface=ITransaction Dispenser). The DTC Transaction Manager 145 returns a Transaction Manager Interface Reference, which is a transaction dispenser interface used to initiate transactions.

At step 420, the Application Program opens the OCX container (330) connected by interface 150 in FIG. 3 to the X/Open-Compatible Resource Manager 120. This is done by, for example, issuing a LogonToDB(&Server) call to the OCX container. The Application Program 190 establishes a connection to the OCX container (330) representing the X/Open-Compatible Resource Manager 120 and the OCX container (330) returns a Connection Handle to the Application Program 190. Referring now to FIG. 3, to open the Resource Manager 120, which is an X/Open Resource Manager, the Container Object 330 is opened. This Container Object 330 includes a Mapper 248. Such a Mapper 248 includes an OLE/CORBA mapper which is generic for any COM/OLE access to services and a transaction mapper which is specific to those services that require transactional properties.

At step 430, a Transaction Object is created. The Application Program 190 calls the ITransaction::BeginTransaction interface. At step 440, the DTC Transaction Manager 145 creates a Transaction Object, generates a Transaction Identifier GUID, stores the TidGUID in the Transaction Object and returns a pointer to the Transaction Object to the Application Program 190. The pointer to the Transaction Object, or token, is not equal to the transaction id.

At step 450, the Application Program 190 implicitly propagates the transaction to each resource. It does this by invoking the Resource Manager's transaction enlistment interface, for example by SQLSetConnect(SQL_Enlist, Connection Handle,&Transaction Object) or by a dbenlisttrans API, which associates the Resource Manager 120 connection with the transaction token (the pointer to the Transaction Object). When the transaction is propagated to the OMG-Compliant Transaction Manager 115, the OMG-Compliant Transaction Manager 115 generates an X/Open transaction. The DTC information, which includes the Connection Handle, the Transaction Object and the X/Open transaction identifier are recorded on the log file 320 so as to allow one to be mapped to the other. The X/Open-Compliant Transaction Manager 115 indicates to the Application program 190 that it has been enlisted. For Resource Managers that are communications Resource Managers this allows a transaction to be propagated without having to export the DTC transaction.

At step 460 the Application Program 190 calls the OCX container (330) representing the X/Open-Compatible Resource Manager API 194 in order to request the performance of a service, such as reading, writing or updating of data held by a resource managed by the X/Open-Compatible Resource Manager 120. This step is described in detail by reference to FIG. 5. The step starts at 461.

Figure 5:
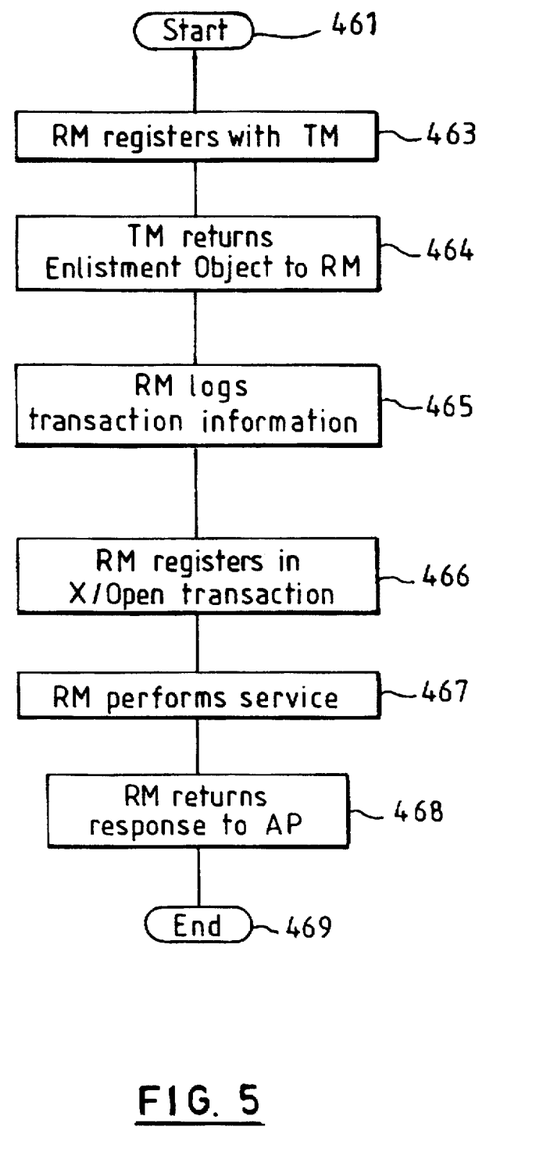
FIG. 5 is a flow diagram detailed the step of performing a service from the flow diagram of FIG. 4.

At step 463, the X/Open-Compliant TP Monitor 240 then registers itself with the DTC Transaction Manager 145 as a participant in the transaction using an IResourceManager::Enlist(&Transactionobject, TransactionResourceAsync) call. This provides the DTC Transaction Manager 145 with an interface to the X/Open-Compatible Resource Manager 120 to use during the commitment process. At step 464, the DTC Transaction Manager 145 returns an Enlistment Object to the X/Open-Compatible Resource Manager 120. The Enlistment Object contains the methods for the Resource Manager 120 to issue after successful completion of the Two Phase Commitment phases. At step 465, the X/Open-Compatible Resource Manager 120 stores DTC transaction information and parameters on the log file 320. At step 466, the X/Open-Compatible Resource Manager 120 registers with the X/Open-Compliant Transaction Manager 115 as a participant in the X/Open transaction started as part of step 450. At step 467, the X/Open-Compatible Resource Manager 120 performs the service which was requested by the Application Program 190. At step 468, the X/Open-Compatible Resource Manager 120 returns a response to the Application Program 190. The step ends at 469.

Referring again to FIG. 4, at step 470, the Application Program 190 requests the DTC Transaction Manager 145 to commit the transaction using an ITransaction::Commit call from the DTC Interface.

At step 480, the DTC Transaction Manager 145 commits the transaction. This step is described in detail by reference to FIG. 6. The step starts at 600.

Figure 6:
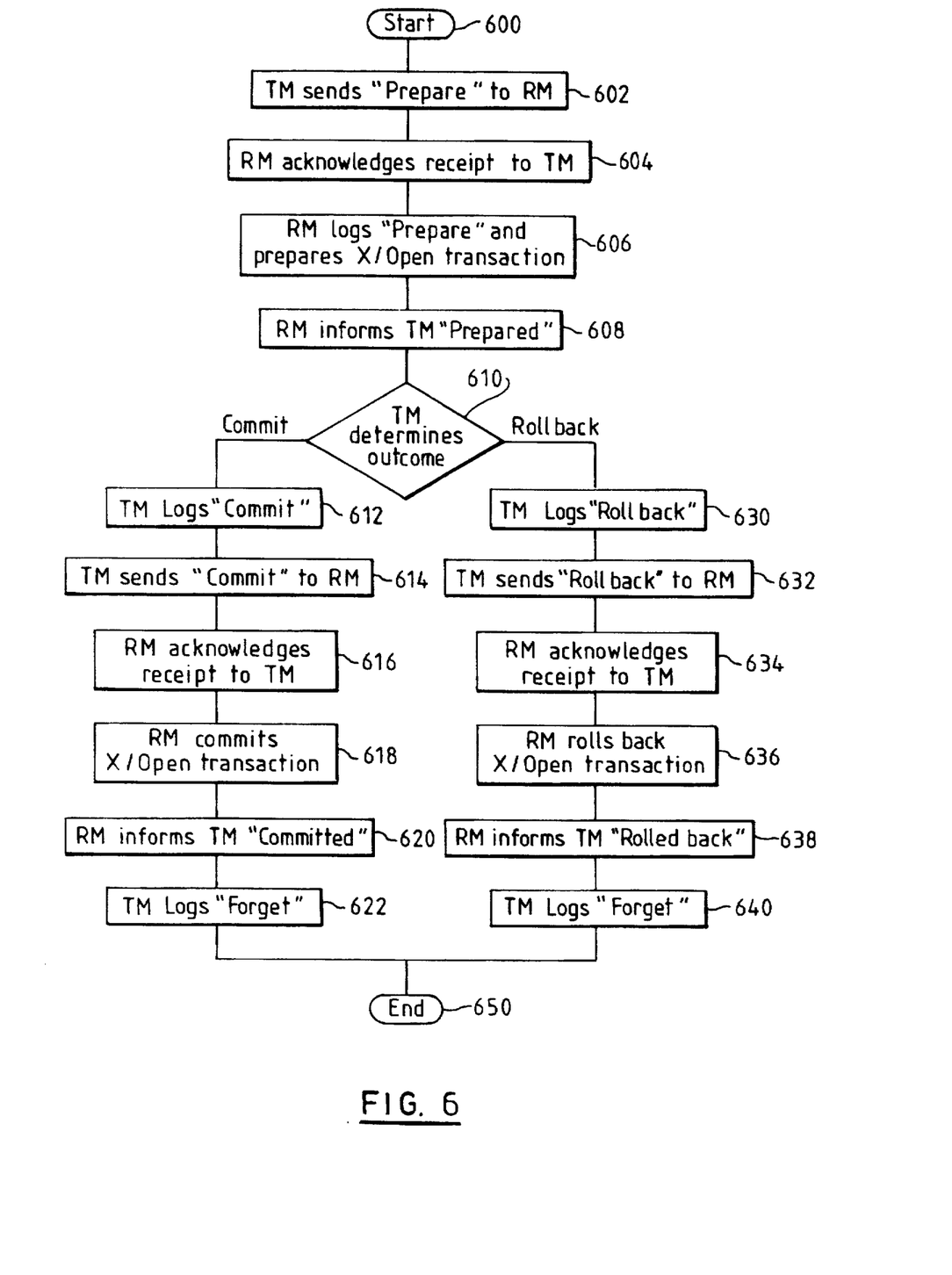
FIG. 6 is a flow diagram detailed the step of committing a transaction from the flow diagram of FIG. 4.

At step 602, the DTC Transaction Manager 145 requests the X/Open-Compatible Resource Manager 120 to prepare its resources for commitment or rollback by using an ITransactionResourceAsync::PrepareRequest from the DTC interface. At step 604, the X/Open-Compatible Resource Manager 120 acknowledges that it has received the prepare request. The X/Open-Compatible Resource Manager 120 determines from the DTC Transaction Manager 145 what DTC Transaction Manager 145 information it will be required to log, such as a participant list, the transaction outcome and any restart information. It does this using IPrepareInfo:GetPrepareInfoSize and IPrepareInfo:GetPrepareInfo? calls. At step 606, the X/Open-Compatible Resource Manager 120, logs on the log file 320 a "Prepare" record and prepares the X/Open transaction. The function of logging a "prepare" record is, in X/Open transaction systems, either done by the transaction manager, rather than by the resource manager, or is done by the resource manager using a log made available by the transaction manager. At step 608, the X/Open-Compatible Resource Manager 120 informs the DTC Transaction Manager 145 that it is "prepared" using the ITransactionEnlistmentAsync:PrepareRequestDone call from the DTC interface.

At step 610, the DTC Transaction Manager 145 determines the outcome of the transaction. If either the X/Open-Compatible Resource Manager 120 or the OLE Resource Manager 130 or any other participants in the transaction have indicated that they cannot commit, or if any of the participants fails to respond, the X/Open-Compatible Transaction Manager 145 causes the changes to be rolled back in each of the resource managers. If all of the responses are positive, then the X/Open-Compatible Transaction Manager 145 orders all of the resource managers to commit the transaction.

If the outcome of the transaction is that it is to commit, then at step 612, the DTC Transaction Manager 145 logs a Commit record on its log file. At step 614, the DTC Transaction Manager 145 requests the X/Open-Compatible Resource Manager 120 to commit the resources for which it is responsible by using the ITransactionResourceAsync: CommitRequest call from the DTC interface. At step 616, the X/Open-Compatible Resource Manager 120 acknowledges that it has received the commit request. At step 618, the X/Open-Compatible Resource Manager 120 logs on the log file 320 a "Committed" record and commits the X/Open transaction. At step 620, the X/Open-Compatible Resource Manager 120 informs the DTC Transaction Manager 145 that it has "committed" the transaction using the ITransactionEnlistmentAsync:CommitRequestDone call from the DTC interface. At step 622, the DTC Transaction Manager 145 logs a Forget record on its log file. The commitment process ends at 650.

If the outcome of the transaction is that it is to roll back the transaction, then at step 630, the DTC Transaction Manager 145 logs a Rolledback record on its log file. At step 632, the DTC Transaction Manager 145 requests the X/Open-Compatible Resource Manager 120 to roll back the updates made to the resources for which it is responsible by using the ITransactionResourceAsync:AbortRequest call from the DTC interface. At step 634, the X/Open-Compatible Resource Manager 120 acknowledges that it has received the rollback request. At step 636, the X/Open-Compatible Resource Manager 120 logs on the log file 320 a "Rolledback" record and rolls back the updates made to the resources by the X/Open transaction. At step 638, the X/Open-Compatible Resource Manager 120 informs the DTC Transaction Manager 145 that it has "backed-out" the updates to the resources made by the transaction using the ITransactionEnlistmentAsync:AbortDone call from the DTC interface. At step 640, the DTC Transaction Manager 145 logs a Forget record on its log file. The commitment process ends at 650.

Referring again to FIG. 4, at step 490, the transaction has been ended.

We claim:

1. A method of processing in a data processing system, a first transaction initiated by an application program and requiring the involvement of a resource manager, the first transaction being managed by a first transaction manager, the protocols of said first transaction manager not being compliant with those of the resource manager, the system further including a second transaction manager, whose protocols are compliant with those of the resource manager and a mapper for converting calls to said first transaction manager to calls to said second transaction manager, the method comprising the steps of:

the application program establishing a connection reference to the resource manager;

the application program obtaining a transaction reference from said first transaction manager; and the mapper initiating a second transaction managed by a second transaction manager with said resource manager, the protocols of said second transaction manager being compliant with those of the resource manager; characterised in that the method further comprises the step of:

after the application program initiates a transaction, said mapper records said connection reference and said transaction reference and associates said connection reference and said transaction reference with a transaction identifier recognisable by the resource manager.

2. A method as claimed in claim 1, wherein the connection reference is a connection handle, the transaction reference is a pointer to an OLE target object and the transaction identifier is an X/Open XID.

3. A method as claimed in claim 1, wherein during interactions between the application program and the resource manager, the transaction manager's identifier for the transaction is included within the data associated with each interaction.

4. A method as claimed in claim 1, wherein during said processing of said transaction, the resource manager stores recovery information in an associated log file.

5. A transaction processing system for processing a first transaction initiated by an application program executing within a data processing system, the transaction system comprising:

a first transaction manager, for managing said first transaction, which provides the application program with a transaction reference;

a resource manager, utilised by said first transaction, with which the protocols of said transaction manager are not compliant and which has a connection reference established by an application program;

a second transaction manager, whose protocols are compliant with said resource manager; and a mapper, which initiates a second transaction managed by a second transaction manager with said resource manager, the protocols of said second transaction manager being compliant with those of the resource manager;

characterised in that:

said mapper records said connection reference and said transaction reference and associates said connection reference and said transaction reference with a transaction identifier recognisable by the resource manager.

6. A system as claimed in claim 5, wherein during interactions between the application program and the resource manager, the transaction manager's identifier for the transaction is included within the data associated with each interaction.

7. A system as claimed in claim 5, wherein the resource manager further comprises an associated log file for storing recovery information.

* * * * *